United States Patent
Agostinelli et al.

(10) Patent No.: US 8,573,180 B2
(45) Date of Patent: Nov. 5, 2013

(54) METHOD AND DEVICE FOR CORRELATING CYLINDER CHARGE AND MAXIMUM INTAKE VALVE LIFT OF INTERNAL COMBUSTION ENGINE

(71) Applicants: Hyundai Motor Company, Seoul (KR);
Kia Motors Corporation, Seoul (KR);
Hyundai Motor Europe Technical Center GmbH, Russelsheim (DE)

(72) Inventors: Patrizio Agostinelli, Viersen (DE);
Juergen Werner, Mainz (DE)

(73) Assignees: Hyundai Motor Company, Seoul (KR);
Kia Motors Corporation, Seoul (KR);
Hyundai Motor Europe Technical Center GmbH, Russelsheim (DE)

( * ) Notice: Subject to any disclaimer, the term of this patent is extended or adjusted under 35 U.S.C. 154(b) by 0 days.

(21) Appl. No.: 13/717,323

(22) Filed: Dec. 17, 2012

(65) Prior Publication Data

US 2013/0110381 A1    May 2, 2013

Related U.S. Application Data

(62) Division of application No. 12/512,622, filed on Jul. 30, 2009, now Pat. No. 8,335,630.

(30) Foreign Application Priority Data

Mar. 18, 2009    (DE) .......................... 10-2009-001644

(51) Int. Cl.
*F02D 13/00* (2006.01)

(52) U.S. Cl.
USPC ............................ 123/345; 123/319; 123/347

(58) Field of Classification Search
USPC ...................... 123/345–348, 319, 321, 90.15
See application file for complete search history.

(56) References Cited

U.S. PATENT DOCUMENTS

| | | | |
|---|---|---|---|
| 5,635,634 A | 6/1997 | Reuschenbach et al. | |
| 6,679,206 B2 * | 1/2004 | Takagi | 123/90.15 |
| 7,003,390 B2 | 2/2006 | Kaga | |
| 7,069,909 B2 | 7/2006 | Pozar | |
| 7,107,965 B2 | 9/2006 | Pozar et al. | |
| 7,324,889 B2 * | 1/2008 | Arai et al. | 701/103 |
| 7,712,440 B2 | 5/2010 | Sandquist et al. | |
| 7,769,525 B2 | 8/2010 | Kakuya et al. | |
| 8,150,597 B2 * | 4/2012 | Yamakawa et al. | 701/103 |
| 8,335,630 B2 * | 12/2012 | Agostinelli et al. | 701/103 |

* cited by examiner

*Primary Examiner* — John Kwon
(74) *Attorney, Agent, or Firm* — Morgan, Lewis & Bockius LLP

(57) ABSTRACT

A method for determining a cylinder charge of an internal-combustion engine having valves with a variable valve gear, may include determining a maximum intake valve lift, calculating a standardized cylinder charge relative to at least one of a defined intake spread of an intake valve opening phase and a defined exhaust spread of an exhaust valve opening phase, as a function of the maximum intake valve lift, determining an overlap value, which characterizes an actual overlap of the intake valve opening phase and the exhaust valve opening phase, and determining a corrected cylinder charge based on the standardized cylinder charge and the overlap value.

13 Claims, 3 Drawing Sheets

METHOD AND DEVICE FOR CORRELATING CYLINDER CHARGE AND MAXIMUM INTAKE VALVE LIFT OF INTERNAL COMBUSTION ENGINE

CROSS-REFERENCE TO RELATED APPLICATION

The present application is a Divisional of U.S. patent application Ser. No. 12/512,622, filed Jul. 30, 2009, which claims priority to German Patent Application No. DE 102009001644.9, filed Mar. 18, 2009, the entire contents of which applications are incorporated herein for all purposes by this reference.

BACKGROUND OF THE INVENTION

1. Field of the Invention

The present invention relates to a method and a device for correlating cylinder charge and intake valve lift in the case of an internal-combustion engine having valves with a variable valve gear. Furthermore, the invention relates to a computer program product for carrying out the method and to an automobile comprising the device.

2. Description of Related Art

In modern engine control systems, a torque-based strategy is commonly employed. The automobile driver or any other torque demand source requires a certain torque. This torque demand is then converted into torque influent control variables, and the control variables are adjusted according to the conversion result in order to cause the engine to deliver the required torque. Typical control variables by which the torque output of an internal-combustion engine can be influenced include the cylinder charge, i.e. the quantity of air loaded into the cylinder, the air-fuel mixture ratio, and the ignition spark angle in the case of a spark ignition engine.

A variation of the cylinder charge can be achieved by means of a throttle flap in a conventional throttled engine, by means of actuation devices changing the intake valve opening angle or opening height, or by increasing the air pressure with a turbo- or other supercharger. In the case of an engine equipped with continuously-variable valve lift (CVVL) technology, the cylinder charge is mainly influenced by the variable maximum intake valve lift, i.e. the maximum height to which the intake valve opens during one engine cycle.

To be able to use the air cylinder charge as a control variable in the case of an engine equipped with continuously-variable valve lift technology, a calculational model correlating the cylinder charge to the maximum intake valve lift is necessary. Such a model is also needed for determining the fuel quantity to be injected in order to achieve a desired air-fuel ratio of the cylinder charge. However, the cylinder charge depends not only by the maximum intake valve lift but in particular also on the intake spread, exhaust spread, rotational engine speed, and the intake conditions, i.e. air temperature and pressure of the air taken in by the engine. Therefore, a calculational model based on a high-dimensional, empirically determined map that takes into account all variables influencing the cylinder charge would require large calculational, in particular memory resources that are impractical or expensive to realize in an on-board control device.

EP 1 030 042 B1 discloses a method of determining the fresh air cylinder charge for unthrottled engines. The calculation is based on a reference two-dimensional map dependent on the maximum intake valve lift and the rotational engine speed, defined at reference cam phasing angles and at reference intake conditions. A first correction factor compensates for other cam phasing angles than the ones corresponding to the reference map. A second correction factor corrects for different intake conditions.

However, when applied to realistic ranges of rotational speed and delivered torque of typical engines, the charge calculation model appears to be not reflecting properly the trapped air mass in the cylinder for all operating points. It is desirable to provide a way of correlating maximum intake valve lift and cylinder charge that yields precise results over a large range of operating points, without recurring to resource-intensive calculation means such as high-dimensional maps.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for determining a cylinder charge of an internal-combustion engine having valves with a variable valve gear. The method includes a step of determining a maximum intake valve lift, i.e. a measure for the maximum height to which the intake valve associated with the cylinder opens during an engine cycle. In another step, a standardized cylinder charge relative to at least one of a defined intake spread of an intake valve opening phase and a defined exhaust spread of an exhaust valve opening phase is calculated as a function of the maximum intake valve lift. For example, the standardized cylinder charge is calculated from the maximum intake valve lift and possibly further variables under the assumption that the intake spread, i.e. the angular distance in terms of crankshaft angle from the upper dead center of the engine is at a predefined constant value. In a further step, an overlap value is determined, which characterizes an actual overlap of the intake valve opening phase and the exhaust-valve opening phase. In a further step, a corrected cylinder charge is calculated based on the standardized cylinder charge and the overlap value. In other words, the influence of the actual overlap existing in comparison to the standardized cylinder charge is determined and the corrected cylinder charge calculated from the standardized cylinder charge based on the determined influence.

By taking into account the overlap of the intake valve opening phase and the exhaust-valve opening phase when calculating the cylinder charge from the maximum intake valve lift, the method enables to incorporate physical effects related to the interaction between intake valve opening phase and the exhaust-valve opening phase, and thus precisely correlate maximum intake-valve lift and cylinder charge, without requiring a high-dimensional and therefore memory-intensive map that covers all possible combinations of intake valve opening phases and the exhaust-valve opening phases that the variable valve gear of the engine may be set to during operation.

According to various aspects of the present invention, in a further step the rotational engine speed is determined. The standardized cylinder charge is calculated as a function not only of the maximum intake-valve lift but also of the rotational engine speed. In this way, a particularly high precision is achievable since the influence, which the rotational engine speed has on the cylinder charge, is enabled to be reflected in the standardized cylinder charge.

According to various aspects of the present invention, the step of calculating the corrected cylinder charge includes calculating a valve-phasing correction factor based on the overlap value, and multiplying the standardized cylinder charge with the valve-phasing correction factor. This has the particular advantage to be easy to implement and require little computational resources in an on-board control device.

According to various aspects of the present invention, the valve-phasing correction factor is calculated based also on at least one of the maximum intake valve lift and the rotational engine speed. In this way, particularly high precision is achievable since effects of the duration of the intake valve opening phase and/or dynamical effects related to the rotational engine speed are enabled to be reflected in the valve-phasing correction factor.

Under other aspects, a further method is provided for determining a maximum intake valve lift of an internal-combustion engine having valves with a variable valve gear. The further method includes steps of determining a desired cylinder charge, of determining an overlap value, which characterizes an actual overlap of an intake valve opening phase and an exhaust valve opening phase, of calculating a standardized cylinder charge relative to at least one of a defined intake spread of the intake valve opening phase and a defined exhaust spread of the exhaust valve opening phase, based on the desired cylinder charge and the overlap value, and of calculating the maximum intake valve lift as a function of the standardized cylinder charge. The further method therefore achieves to correlate the maximum intake valve spread and the cylinder charge by performing a conversion in the inverted direction, starting from the desired cylinder charge and resulting in a corresponding value of the maximum intake valve spread.

Preferably, the rotational engine speed is determined in a further step, the maximum intake valve lift being calculated as a function also of the rotational engine speed. In this way, a particularly high precision is achievable since the influence, which the rotational engine speed has on the cylinder charge, is enabled to be reflected in the standardized maximum intake valve lift.

According to various aspects of the present invention, the step of calculating the standardized cylinder charge includes calculating a valve-phasing correction factor based on the overlap value, and dividing the desired cylinder charge by the valve-phasing correction factor. This has the particular advantage to be easy to implement and require little computational resources in an on-board control device. The step of dividing may also be formulated as an equivalent step of multiplying the desired cylinder charge by the valve-phasing correction factor, as is immediately seen by changing the definition of the valve-phasing correction factor to its inverse.

Preferably, the valve-phasing correction factor is calculated based also on the rotational engine speed. In this way, particularly high precision is achievable since dynamical effects related to the rotational engine speed are enabled to be reflected in the valve-phasing correction factor.

According to various aspects of the present invention, the method is performed iteratively, wherein the valve-phasing correction factor is calculated based also on the maximum intake valve lift as determined in an earlier iteration. In this way, particularly high precision is achievable since further effects such as e.g. of the duration of the intake valve opening phase are enabled to be reflected in the valve-phasing correction factor.

According to various aspects of the present invention, the standardized cylinder charge is calculated relative to the defined intake valve spread. The step of calculating the cylinder-charge correction factor includes determining an actual intake spread, calculating an intake spread correction factor based on the actual intake spread, calculating an overlap correction factor based on the overlap value, and multiplying the overlap correction factor and the intake spread correction factor. In this way, particularly high precision can be achieved, since the influence of the actual intake spread on the cylinder charge as compared to the defined intake spread is enabled to be reflected in the correction factor, in addition to the cross-influence of the actual intake and exhaust spread as reflected in the overlap of intake and exhaust valve opening phases.

According to various aspects of the present invention, the standardized cylinder charge is calculated furthermore relative to a defined exhaust spread. Herein, the step of calculating the cylinder-charge correction factor includes determining an actual exhaust spread, calculating an exhaust spread correction factor based on the actual exhaust spread, calculating an overlap correction factor based on the overlap value, and multiplying the overlap correction factor and the exhaust-spread correction factor. In this way, particularly high precision can be achieved, since the influence of the actual exhaust spread on the cylinder charge as compared to the defined exhaust spread is enabled to be reflected in the correction factor, in addition to the cross-influence of the actual intake and exhaust spread as reflected in the overlap of intake and exhaust valve opening phases.

According to various aspects of the present invention, the step of determining the overlap value includes determining at least one of an angular amount of the overlap of the intake valve opening phase and the exhaust valve opening phase, a location angle of the overlap of the intake valve opening phase and the exhaust valve opening phase, and an overlap area of a first area under an intake valve lift curve and a second area under an exhaust valve lift curve. In this way the overlap value is easily calculable by an on-board control device, while reflecting the geometrical conditions of the variable valve gear that are related to cross-influence of intake spread and exhaust spread on the correlation between maximum intake valve lift and cylinder charge.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In the figures, like reference signs denote like elements or elements having like functionality, unless explicitly indicated otherwise.

Figure 1:
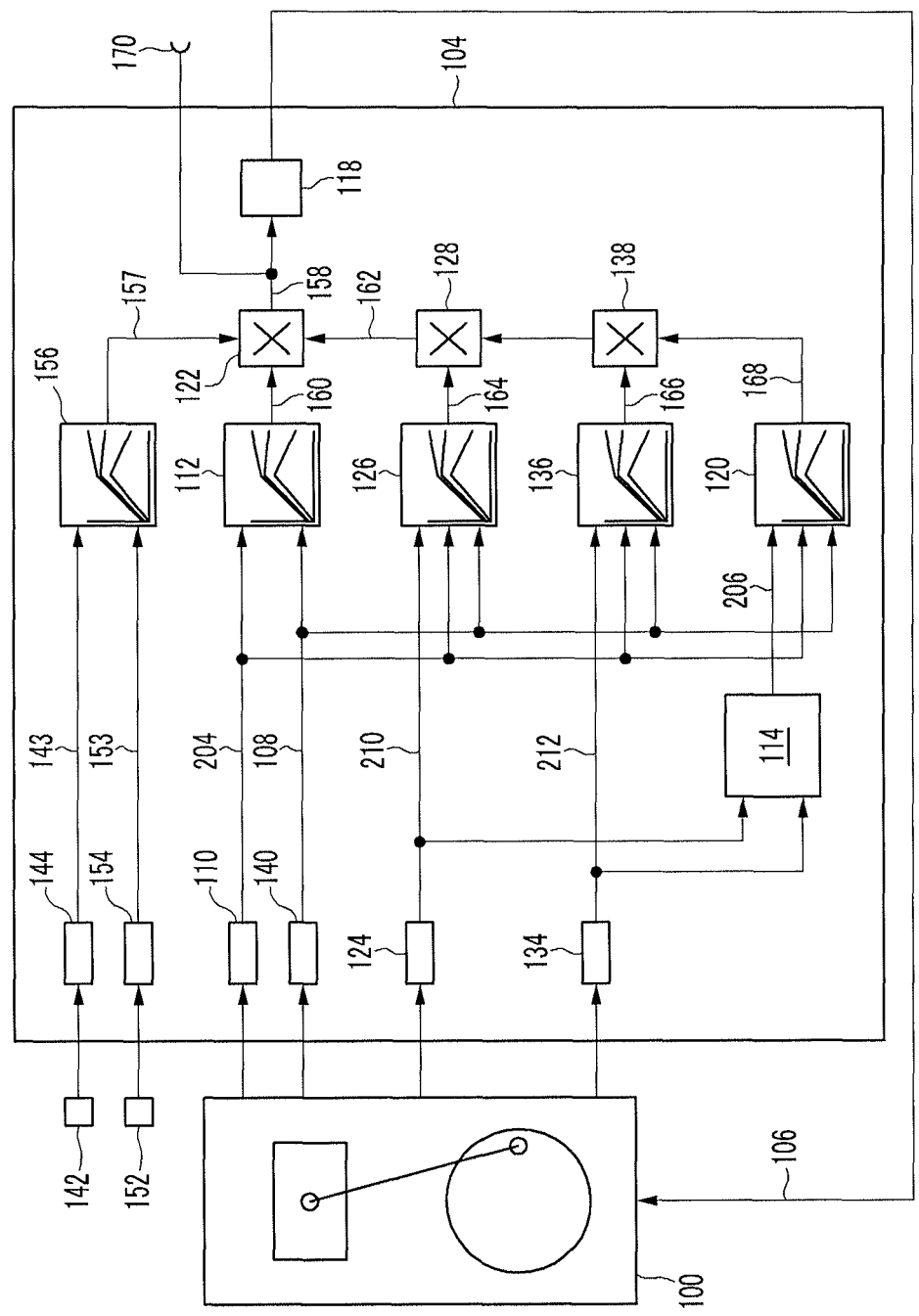
FIG. 1 is a block diagram of an exemplary method and device according to the present invention.

FIG. 1 shows in a block diagram an internal-combustion engine 100 having valves with a variable valve gear, and a control device 104 for determining a cylinder charge 158 of the engine 100. The control device 104 includes an injection amount determiner 118, which during operation of the engine 100 continuously determines a fuel injection amount 106 that is supplied to the engine 100 in order to achieve a desired air-fuel ratio.

The functionality of the variable valve gear of the engine 100 shall in the following be explained with the aid of a diagram shown in FIG. 2, where a horizontal axis 224 represents the crank shaft angle of the engine 100, spanning a portion of the engine cycle that is centered around the top dead center 220 of a given cylinder of the engine 100. Although the engine 100 may comprise more than one cylinder, only a single cylinder is considered here for clarity. A vertical axis 222 of the diagram represents valve lift, i.e. the opening height of the intake and exhaust valves associated with the cylinder.

A first curve 214 shows an exemplary dependency of the intake valve lift on the crank shaft angle. When during operation of the engine 100 the crank shaft angle traverses the interval of the horizontal axis 224 from left to right, the intake valve initially remains closed, corresponding to an intake valve lift of zero. At an intake valve opening angle 230 the intake valve opens, its opening height 214 gradually rising until a maximum intake valve lift 204 is reached at the position of an intake valve maximum lift angle 234. From then on, the intake valve lift curve 214 falls again until the intake valve closes at an intake valve closing angle 232. Both the maximum intake valve lift 204 and the angular distance 210 from the intake valve maximum lift angle 234 to the top dead center 220, hereinafter referred to as intake spread 210, can be varied dynamically during operation of the engine 100 by means of the variable valve gear. When the maximum intake valve lift 204 is increased, the intake valve opening phase 200, defined as the angular distance between the intake valve opening angle 230 and the intake valve closing angle 232, increases as well in its angular extent.

Figure 2:
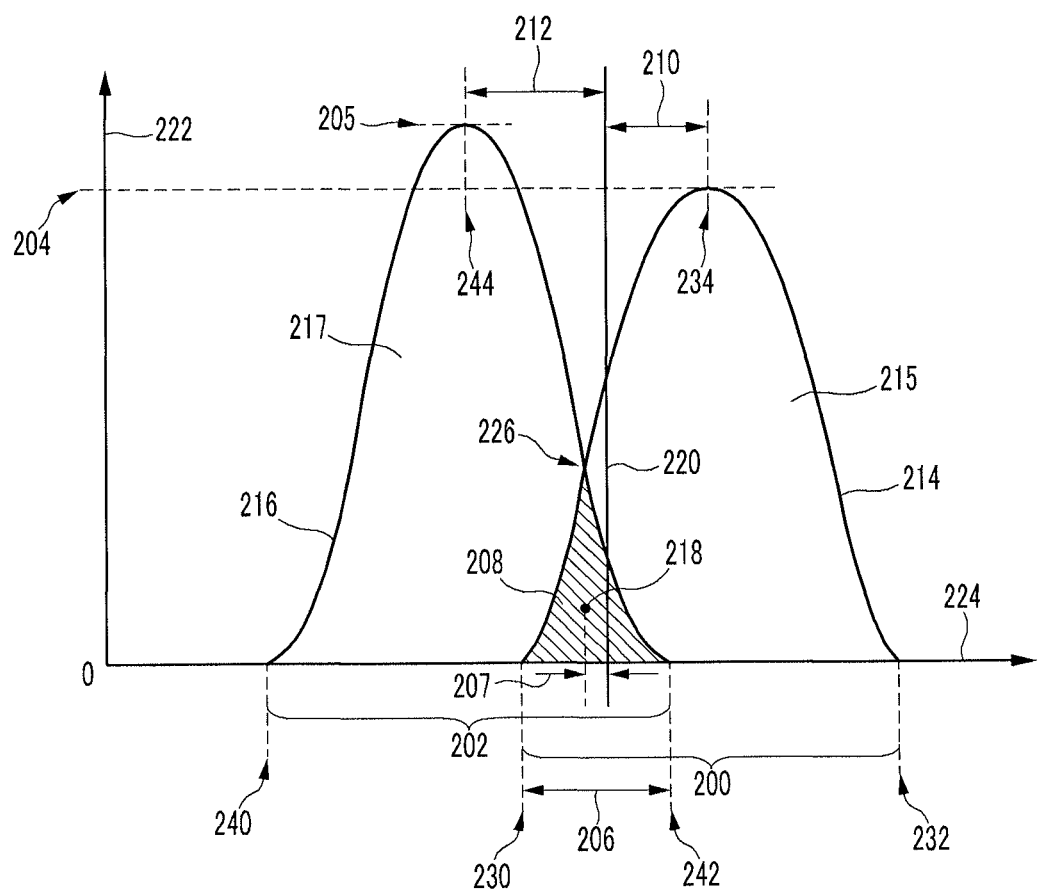
FIG. 2 is a diagram showing opening curves of intake and exhaust valves of an internal-combustion engine having valves with a variable valve gear according to FIG. 1.

Likewise, a second curve 216 displayed in FIG. 2 shows an exemplary dependency of the exhaust valve lift 216 on the crank shaft angle. When during operation of the engine 100 the crank shaft angle traverses the displayed interval of the horizontal axis 224, the exhaust valve at first remains closed until an exhaust valve opening angle 240 is reached. Here, the exhaust valve opens, its opening height 216 gradually rising until a maximum exhaust valve lift 205 is reached at the position of an exhaust valve maximum lift angle 244. From then on, the exhaust valve lift curve 216 falls again until the exhaust valve closes at an exhaust valve closing angle 242. The angular distance 212 from the exhaust valve maximum lift angle 244 to the top dead center 220, hereinafter referred to as exhaust spread 212, can be varied dynamically during operation of the engine 100 by means of the variable valve gear, while the maximum exhaust valve lift 205 is without restriction of generality assumed to be fixed in the case of the present engine 100. Since the maximum exhaust valve lift 205 is thus assumed to be fixed, the exhaust valve opening phase 202, defined as the angular distance between the exhaust valve opening angle 240 and the exhaust valve closing angle 242, is assumed to be fixed as well in its angular extent. However, when the exhaust spread 212 is varied, the exhaust valve opening phase 202 shifts along the crank shaft angle axis 224 while retaining its constant width.

In the exemplary situation shown in FIG. 2, the intake valve opening phase 200 and the exhaust valve opening phase 202 partially overlap each other with an overlap angular amount 206. Depending on the variation of the intake spread 210, the exhaust spread 212, and the maximum intake valve lift 204, the overlap angular amount 206 will in general vary and even become zero, e.g. in the case of sufficiently large values of the intake spread 210 and exhaust spread 212 and/or sufficiently small maximum intake valve lift 204.

The device 104 for determining the cylinder charge 158 shown in FIG. 1 comprises a valve lift determiner 110, which is connected to the engine 100 in a way suitable to determine e.g. continuously or in regular intervals the actually valid value of the maximum intake valve lift 204. For example, the valve lift determiner 110 is connected to a detector within the engine 100 that detects a position of the variable valve gear mechanism from which the actual maximum intake valve lift 204 can be inferred. The valve lift determiner 110 may also be connected to an electronic control unit of the engine 100 that calculates the desired maximum intake valve lift and controls the variable valve gear of the engine 100 such that the maximum intake valve lift 104 assumes the desired value.

The device 104 further comprises a rotational engine speed determiner 140, which determines the rotational engine speed 108 of the engine 100. Similar to the valve lift determiner 110, the rotational engine speed determiner 140 is connected to the engine 100 in a way suitable for determining the rotational engine speed 108. For example, the rotational engine speed determiner 140 is connected to a rotational engine speed detector internal to the engine 100. The device 104 further comprises an intake valve spread determiner 124, which is connected to the engine 100 and determines an intake valve spread 210. For example, the intake valve spread determiner 124 is connected to an intake spread detector that detects the current intake spread 210 from a position of the variable valve gear of the engine 100, or/and to a control unit of the engine 100 that sets the variable valve gear to a desired intake spread. Similarly, the device 104 further comprises an exhaust spread determiner 134, which likewise is connected to the engine 100 in such a way as to determine the current exhaust spread 212 e.g. from an exhaust spread detector or a control unit of the engine 100 that controls the variable valve gear by setting it to a desired exhaust spread value.

Furthermore, the device 104 comprises an air pressure determiner 144, which is connected to an air pressure sensor 142 and determines the current pressure 143 of the air taken in by the engine 100. Likewise, the device 104 comprises an air temperature determiner 154 which is connected to an air temperature sensor 152 and determines the current temperature 153 of the air taken in by the engine 100. The air pressure sensor 142 and air temperature sensor 152 are each installed in a location suitable for determining the condition of the air taken in by the engine 100, e.g. inside an air intake duct of the engine 100.

Furthermore, the device 104 comprises an overlap determiner 114, which determines an overlap value 206 that characterizes an overlap of the intake valve opening phase 200 and the exhaust valve opening phase 202 as shown in FIG. 2. In various embodiments, the overlap value 206 is assumed to coincide with the overlap angular amount 206 of the intake valve opening phase 200 and the exhaust valve opening phase 202. However, in other embodiments other suitable values that characterize the overlap of the intake valve opening phase 200 and the exhaust valve opening phase 202 may be used.

For example, the numerical amount of the overlap area 208, formed by the overlap of the area 215 under the intake valve lift curve 214 and the area 217 under the exhaust valve lift curve 216, may be used as the overlap value determined by the overlap determiner 114. As another example, an angular location of the overlap may be used as the overlap value, such as e. g. as the angular location 226 of the intersection of the curves 215, 216, or the angular location of the centroid 218 of the overlap area 208, given as the angular distance 207 of the centroid 218 from the top dead center 220 or in other suitable ways. The overlap determiner 114 is connected to the intake spread determiner 124 and the exhaust spread determiner 134, which supply the overlap determiner 114 with current values of the intake spread 210 and the exhaust spread 212, respectively. In various embodiments, the overlap determiner 114 is further connected to the valve lift determiner 110 and adapted to calculate the overlap value based on the maximum intake valve lift 204 in addition to the intake spread 210 and the exhaust spread 212.

The device 104 comprises a cylinder-charge calculation unit 112, which calculates a standardized cylinder charge 160, as a function of the maximum intake valve lift 204 and the rotational engine speed 108, relative to defined intake conditions (i.e. pressure and temperature of the air taken in by the engine 100), a defined intake spread of the intake valve opening phase 200 and a defined exhaust spread of an exhaust valve opening phase 202. For example, the cylinder-charge calculation unit 112 calculates the standardized cylinder charge 160 relative to 1013 hPa air pressure at an air temperature of 0° C. and the intake spread 210 and the exhaust spread 212 as shown in FIG. 2, or relative to the largest possible values of the intake spread 210 and exhaust spread 212 realizable by the variable valve gear of the engine 100. The cylinder-charge calculation unit 112 is connected to the respective outputs of the valve-lift determiner 110 and the rotational engine speed determiner 140 and comprises e.g. a two-dimensional map that maps value pairs of the maximum intake valve lift 204 and the rotational engine speed 108 to values of the standardized cylinder charge 160, with suitable interpolation.

The device 104 further comprises an air condition correction factor calculation unit 156 that is connected to the air temperature determiner 154 and the air pressure determiner 144 and comprises a calculational rule that maps value pairs of the air temperature 153 and air pressure 143 to values of an air condition correction factor 157. For example, the calculational rule may be stored in the air condition correction factor calculation unit 156 in the form of a two-dimensional map, optionally supplemented with interpolation rules, a mathematical formula, an algorithmic definition, or a combination of two or more of these. The air condition correction factor calculation unit 156 is adapted to calculate the air condition correction factor 157 from the current air temperature 153 and air pressure 143 and supply the result to a cylinder charge correction multiplier 122, which multiplies it with the standardized cylinder charge 160. The two-dimensional map of the air condition correction factor calculation unit 156 is suitably calibrated in such a way that the product of the air condition correction factor 157 and the standardized cylinder charge 160 most closely reflects the real dependence of the cylinder charge of the engine 100 relative to the defined intake spread and the defined exhaust spread for the respective ranges of the air temperature 153, air pressure 143, maximum intake valve lift 204, and rotational engine speed.

The device 104 further comprises an intake spread correction factor calculation unit 126 that is connected to the valve-lift determiner 110, the rotational engine speed determiner 140, and the intake spread determiner 124. The intake spread correction factor calculation unit 126 comprises e.g. a three-dimensional map that maps value triples of the maximum intake valve lift 204, the rotational engine speed 108, and the actual intake spread 210 to values of an intake spread correction factor 164. The intake spread correction factor calculation unit 126 is adapted to calculate the intake spread correction factor 164 from the current intake spread 210, the current maximum intake valve lift 204, and the current rotational engine speed 108 and supply the result to an intake spread correction factor multiplier 128. The three-dimensional map of the intake spread correction factor calculation unit 126 is suitably calibrated in such a way that the product of the intake spread correction factor 164 and the standardized cylinder charge 160 most closely reflects the real dependence of the cylinder charge of the engine 100 relative to the defined intake conditions and the defined exhaust spread for the respective ranges of the intake spread 210, maximum intake valve lift 204, and rotational engine speed.

The device 104 further comprises an exhaust spread correction factor calculation unit 136 that is connected to the valve-lift determiner 110, the rotational engine speed determiner 140, and the exhaust spread determiner 134. The exhaust spread correction factor calculation unit 136 comprises e.g. a three-dimensional map that maps value triples of the maximum intake valve lift 204, the rotational engine speed 108, and the actual exhaust spread 212 to values of an exhaust spread correction factor 166. The exhaust spread correction factor calculation unit 136 is adapted to calculate the exhaust spread correction factor 166 from the current exhaust spread 212, the current maximum intake valve lift 204, and the current rotational engine speed 108 and supply the result to an exhaust spread correction factor multiplier 138. The three-dimensional map of the exhaust spread correction factor calculation unit 136 is suitably calibrated in such a way that the product of the intake spread correction factor 164, the exhaust spread correction factor 166, and the standardized cylinder charge 160 most closely reflects the real dependence of the cylinder charge of the engine 100 relative to the defined intake conditions for the respective ranges of the intake spread 210, exhaust spread 212, maximum intake valve lift 204, and rotational engine speed.

The device 104 further comprises an overlap correction factor calculation unit 120 that is connected to the valve-lift determiner 110, the rotational engine speed determiner 140, and the overlap determiner 114. The overlap correction factor calculation unit 120 comprises e.g. a three-dimensional map that maps value triples of the maximum intake valve lift 204, the rotational engine speed 108, and the actual overlap value 206 to values of an overlap correction factor 168. Herein, the overlap value 206 may be defined in various suitable ways as described above with reference to FIG. 2. The overlap correction factor calculation unit 120 is adapted to calculate the overlap correction factor 168 from the current overlap value 206, the current maximum intake valve lift 204, and the current rotational engine speed 108 and supply the result to the exhaust spread correction factor multiplier 138. The three-dimensional map of the overlap correction factor calculation unit 120 is suitably calibrated in such a way that the product of the intake spread correction factor 164, the exhaust spread correction factor 166, the overlap correction factor 168 and the standardized cylinder charge 160 most closely reflects the real dependence of the cylinder charge of the engine 100 relative to the defined intake conditions for the respective ranges of the intake spread 210, exhaust spread 212, maximum intake valve lift 204, and rotational engine speed.

The exhaust spread correction factor multiplier 138 and the intake spread correction factor multiplier 128 are connected in such a way they form a multiplication unit that multiplies the overlap correction factor 168, the exhaust spread correction factor 166, and the intake spread correction factor 164 into an overall valve-phasing correction factor 162 that is supplied to the cylinder-charge correction multiplier 122. The cylinder-charge correction multiplier 122 multiplies the standardized cylinder charge 160 with both the air condition correction factor 157 and the valve-phasing correction factor 162, and supplies the resulting corrected cylinder charge 158 both to the injection amount determiner 118 and to an output interface 170 of the device 104 for connecting further utilizing devices that utilize the supplied value of the corrected cylinder charge 158. The injection amount determiner 118 merely represents a special case of such a utilizing device and may in various embodiments not be present, or be externally connectable to the output interface 170 as a separate unit.

As further examples of utilizing devices, by means of the output interface 170, the device 104 may be connected to an on-board diagnostic unit of an automobile in which the engine 100 is installed. As another example, the output interface 170 may be connected to a calibration device that compares the corrected cylinder charge 158 to an actual cylinder charge value supplied in a different way, e.g. by a sensor installed in the engine 100, in order to calibrate calculational rules implemented in the device 104 to closely reflect the physical properties of the engine 100.

Figure 3:
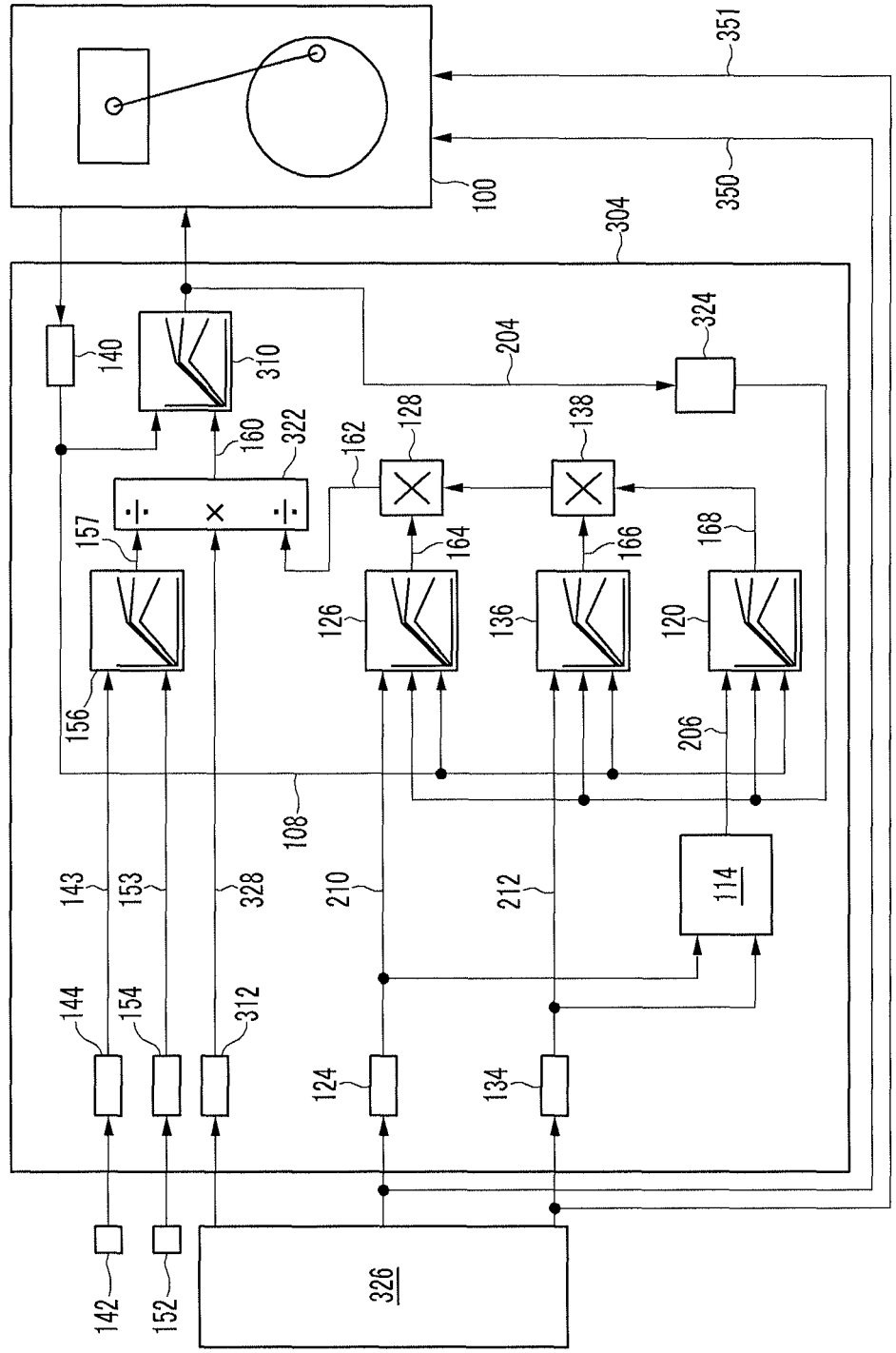
FIG. 3 is a block diagram of an method and device according to the present invention.

FIG. 3 shows an internal-combustion engine 100 having valves with a variable valve gear, a command unit 326 that sends commands 350, 351 based e.g. on demands of an automobile driver to the engine that cause the engine to operate at a desired intake spread 210 and a desired exhaust spread 212 according to the commands 350, 351. Further shown is a device 304 for determining a maximum intake valve lift 204 of the internal-combustion engine. The device 304 is connected to both the command unit 326 and the engine 100 and comprises a cylinder-charge determiner 312 that determines a desired cylinder charge 328 from the commands of the command unit 326.

The device 304 further comprises a divider 322 that is connected to the cylinder-charge determiner 312 that divides it by both an air condition correction factor 157 and a valve-phasing correction factor 162 that are calculated in essentially the same way as described with respect to the device 104 of FIG. 1. Thus the output of the divider 322 corresponds to the standardized cylinder charge 160 as described with respect to the device 104 of FIG. 1. The device 304 further comprises a valve-lift calculation unit 310 that receives the standardized cylinder charge 160 from the divider 322 and the rotational engine speed 108 from the rotational engine speed determiner 140. The valve-lift calculation unit 310 comprises e.g. a two-dimensional map that corresponds to the inverse of the map of the cylinder-charge calculation unit 112 of the device 104 of FIG. 1. The valve-lift calculation unit 310 calculates a desired maximum intake valve lift 204 that is both used to directly control the engine 100 and supplied to a low-pass filter 324 that low-pass filters the desired maximum intake-valve lift 204 and feeds back the resulting filtered value to the intake spread correction factor calculation unit 126, the exhaust spread correction factor calculation unit 136, and the overlap correction-factor calculation unit 120.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for determining a maximum intake valve lift of an internal-combustion engine having valves with a variable valve gear, the method comprising:
    determining a desired cylinder charge;
    determining an overlap value, which characterizes an actual overlap of an intake valve opening phase and an exhaust valve opening phase;
    calculating a standardized cylinder charge relative to at least one of a defined intake spread of the intake valve opening phase and a defined exhaust spread of the exhaust valve opening phase, based on the desired cylinder charge and the overlap value; and
    determining the maximum intake valve lift as a function of the standardized cylinder charge.

2. The method according to claim 1, further comprising determining the rotational engine speed, wherein the maximum intake valve lift is calculated furthermore as a function of the rotational engine speed.

3. The method according to claim 1, wherein the step of calculating the standardized cylinder charge comprises:
    calculating a valve-phasing correction factor based on the overlap value; and
    dividing the desired cylinder charge by the valve-phasing correction factor.

4. The method according to claim 3, wherein the valve-phasing correction factor is calculated furthermore based on the rotational engine speed.

5. The method according to claim 3, further comprising performing the method iteratively, wherein the valve-phasing correction factor is calculated furthermore based on the maximum intake valve lift as determined in an earlier iteration.

6. The method according to claim 3, wherein the standardized cylinder charge is calculated relative to the defined intake spread, and the step of calculating the valve-phasing correction factor comprises:
    determining an actual intake spread;
    calculating an intake-spread correction factor based on the actual intake spread;
    calculating an overlap correction factor based on the overlap value; and
    multiplying the overlap correction factor and the intake spread correction factor.

7. The method according to claim 3, wherein the standardized cylinder charge is calculated relative to the defined exhaust spread, and the step of calculating the valve-phasing correction factor comprises:
    determining an actual exhaust spread;
    calculating an exhaust-spread correction factor based on the actual exhaust spread;
    calculating an overlap correction factor based on the overlap value; and
    multiplying the overlap correction factor and the exhaust-spread correction factor.

8. The method according to claim 1, wherein determining the overlap value comprises determining at least one of:
    an angular amount of the overlap of the intake valve opening phase and the exhaust valve opening phase;

a location angle of the overlap of the intake valve opening phase and the exhaust valve opening phase; and an overlap area of a first area formed under an intake valve lift curve and a second area formed under an exhaust valve lift curve.

9. A device for determining a maximum intake valve lift of an internal-combustion engine having valves with a variable valve gear, comprising:

- a cylinder-charge determiner, which determines a desired cylinder charge;
- an overlap determiner, which determines an overlap value characterizing an actual overlap of an intake valve opening phase and an exhaust valve opening phase;
- a cylinder-charge calculation unit, which calculates a standardized cylinder charge relative to at least one of a defined intake spread of the intake valve opening phase and a defined exhaust spread of the exhaust valve opening phase, based on the desired cylinder charge and the overlap value; and
- a valve-lift calculation unit, which calculates the maximum intake valve lift as a function of the standardized cylinder charge.

10. The device according to claim 9, wherein the cylinder-charge calculation unit comprises:

- a correction-factor calculation unit, which calculates a valve-phasing correction factor based on the overlap value; and
- a divider, which divides the desired cylinder charge by the valve-phasing correction factor.

11. The device according to claim 10, further comprising a low-pass filter, which filters the maximum intake valve lift, wherein the correction-factor calculation unit is adapted to calculate the valve-phasing correction factor furthermore based on the filtered maximum intake valve lift.

12. The device according to claim 10, the cylinder-charge calculation unit being adapted to calculate the standardized cylinder charge relative to the defined intake spread, wherein the correction-factor calculation unit comprises:

- an intake spread determiner, which determines an actual intake spread;
- an intake spread correction factor calculation unit, which calculates an intake spread correction factor based on the actual intake spread;
- an overlap correction factor calculation unit, which calculates an overlap correction factor based on the overlap value; and
- a multiplication unit, which calculates the valve-phasing correction factor as a product including the overlap correction factor and the intake spread correction factor.

13. The device according to claim 12, the cylinder-charge calculation unit being adapted to calculate the standardized cylinder charge furthermore relative to the defined exhaust spread, wherein the correction-factor calculation unit further comprises:

- an exhaust spread determiner, which determines an actual exhaust spread; and
- an exhaust spread calculation unit, which calculates an exhaust-spread correction factor based on the actual exhaust spread;
- wherein the multiplication unit is adapted to calculate the valve-phasing correction factor as the product further including the exhaust-spread correction factor.

* * * * *